United States Patent [19]
Post

[11] 4,080,801
[45] Mar. 28, 1978

[54] ENGINE HEATED COMPRESSED DRIVE FOR VEHICLE AIR CONDITIONER

[75] Inventor: Gerhard K. Post, Pawcatuck, Conn.

[73] Assignee: The Raymond Lee Organization, Inc., New York, N.Y.

[21] Appl. No.: 733,798

[22] Filed: Oct. 19, 1976

[51] Int. Cl.² ............ F25B 27/02; B60H 3/04; F25B 1/00; F04B 17/00
[52] U.S. Cl. .................................. 62/238; 62/243; 62/501; 417/379
[58] Field of Search .............. 62/238, 239, 243, 501; 417/207, 379, 380

[56] References Cited

U.S. PATENT DOCUMENTS

| | | | |
|---|---|---|---|
| 1,102,998 | 7/1914 | Coleman | 62/501 |
| 2,039,999 | 5/1936 | Holyfield | 62/501 |
| 2,783,622 | 3/1957 | Bourassa | 62/243 |
| 2,990,694 | 7/1961 | Kummerlowe et al. | 62/243 |
| 2,991,632 | 7/1961 | Rogers | 62/238 |
| 3,196,631 | 7/1965 | Holland | 62/238 |
| 3,470,707 | 10/1969 | Lofgreen et al. | 62/238 |
| 3,823,573 | 7/1974 | Cassady | 62/238 |

*Primary Examiner* — Lloyd L. King
*Attorney, Agent, or Firm* — Howard I. Podell

[57] ABSTRACT

An engine for driving the compressor of an air conditioner system which is powered by the heat of the exhaust manifold of a vehicle internal combustion engine. The engine of the invention includes a closed cylinder with a piston dividing the cylinder into two compartments, and with the piston rod extending beyond one end of the cylinder to power both the air conditioner compressor pump and a liquid pump that supplies the engine with pressurized liquid. The inlet port of the engine is located on a cylinder wall midway between the cylinder ends, with bores in the piston linking the inlet port with each cylinder compartment at the position of the cylinder that reduces the particular compartment to its minimum volume. Each end of the cylinder is surrounded by a heated exhaust jacket so that the liquid fed into the cylinder compartment is vaporized to expand the cylinder compartment and drive the piston. An exhaust port extends from each cylinder end with each exhaust port blocked in turn by a slide rod that extends axially through the cylinder and into each exhaust port. A piston is fixed to the slide block in an auxiliary cylinder chamber inside the piston so that the pressurized gas in one engine cylinder compartment is led by ports in the piston to one of the two auxiliary cylinder compartments to maintain the slide rod in bearing engagement against the exhaust valve opening leading from the pressurized engine cylinder compartment until the piston reaches the end of the expansion stroke. The exhaust gas of the engine is led through a condenser, with the condensate led through the liquid pump and a cooler to the intake port.

5 Claims, 2 Drawing Figures

ENGINE HEATED COMPRESSED DRIVE FOR VEHICLE AIR CONDITIONER

SUMMARY OF THE INVENTION

My invention is an engine for driving the compressor of an air conditioner system which is powered by the heat of the exhaust manifold of a vehicle internal combustion engine.

The engine of the invention includes a closed cylinder with a piston dividing the cylinder into two compartments, and with the piston rod extending beyond one end of the cylinder to power both the air conditioner compressor pump and a liquid pump that supplies the engine with pressurized liquid. The inlet port of the engine is located on a cylinder wall midway between the cylinder ends, with bores in the piston linking the inlet port with each cylinder compartment at the position of the cylinder that reduces the particular compartment to its minimum volume.

Each end of the cylinder is surrounded by a heated exhaust jacket so that the liquid fed into the cylinder compartment is vaporized to expand the cylinder compartment and drive the piston. An exhaust port extends from each cylinder end with each exhaust port blocked in turn by a slide rod that extends axially through the cylinder and into each exhaust port.

A piston is fixed to the slide block in an auxiliary cylinder chamber inside the piston so that the pressurized gas in one engine cylinder compartment is led by ports in the piston to one of the two auxiliary cylinder compartments to maintain the slide rod in bearing engagement against the exhaust valve opening leading from the pressurized engine cylinder compartment until the piston reaches the end of the expansion stroke.

The exhaust gas of the engine is led through a condenser, with the condensate led through the liquid pump and a cooler to the intake port.

BRIEF DESCRIPTION OF THE DRAWINGS

The objects and features of the invention may be understood with reference to the following detailed description of an illustrative embodiment of the invention taken together with the accompanying drawings in which.

Figure 1:
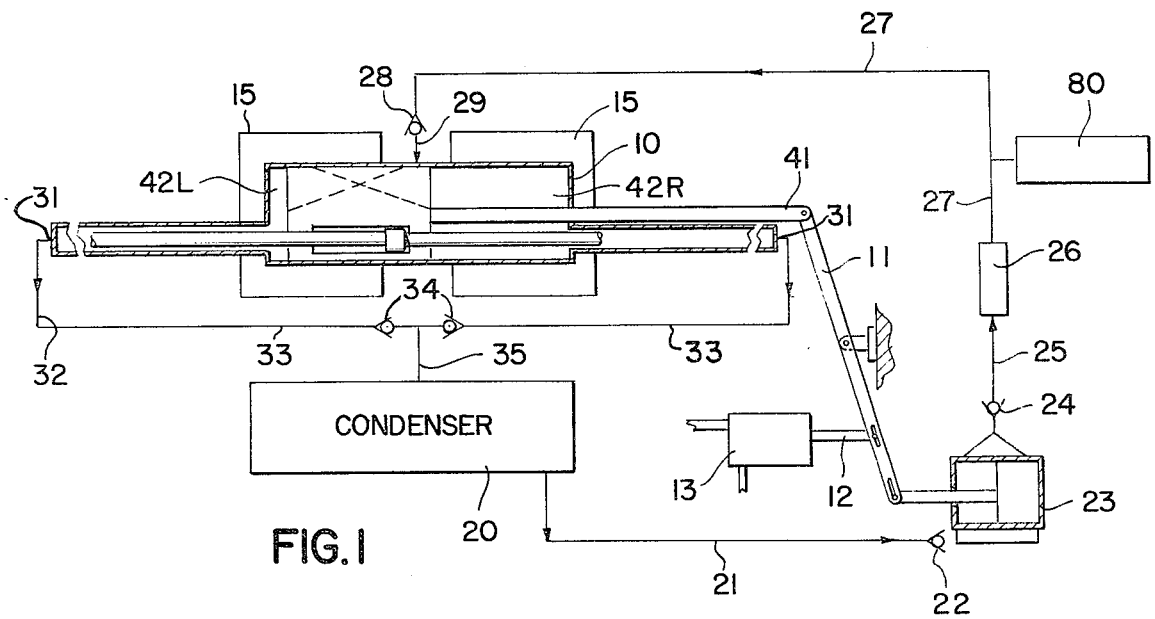
FIG. 1 is a schematic diagram of the engine.
Figure 2:
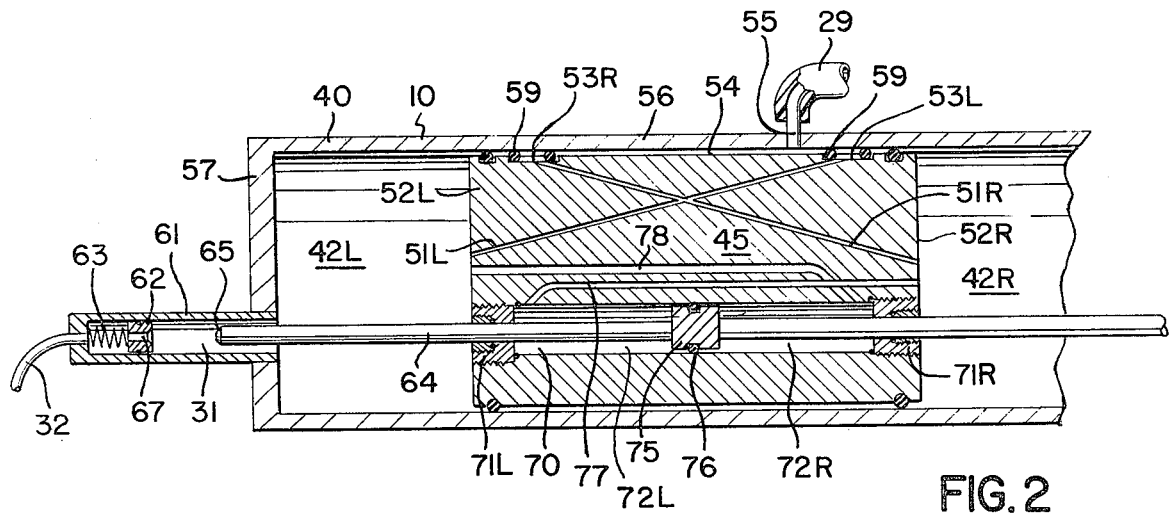
FIG. 2 is a sectional view of the engine cylinder and piston.

DESCRIPTION OF THE PREFERRED EMBODIMENT:

Turning now descriptively to the drawings, in which similar reference characters denote similar elements throughout the several views, FIGS. 1-2 illustrate the engine 10, the drive rod 11 of which powers the shaft 12 of a compressor pump 13 connected to a conventional air conditioning system in a vehicle. Engine 10 is powered by the heat of the exhaust gas in a jacket 15 leading from the exhaust manifold of an internal combustion engine of the said vehicle.

As shown in FIG. 1, condensed liquid such as freon is led from a condensor 20 through tube 21 and check valve 22 into a pump 23 in which it is compressed, being led under pressure through check valve 24 and tube 25 through a cooler 26 and by tube 27 through a check valve 28 to the inlet port 29 of the engine 10. An accumulater 80 is connected to tube 27 to serve as a constant pressure reservoir. Each of the exhaust ports 31 of the engine are joined by a tube 33 through a check valve 34 to a tube leading to the condensor 20.

Pump 23 is powered by lever 11 which is driven by piston shaft 41.

The pressurized liquid led into a left chamber 42L of the cylinder 40 of the engine is vaporized by the heat from the surrounding jacket 15 containing the motor vehicle exhaust gas, with the consequent expansion driving piston 45 rightwards to compress the volume of right chamber 42R, the exhaust port of which is open. At the end of the piston stroke, the exhaust port to chamber 42L is opened, permitting the piston to travel back leftwards towards chamber 42L and simultaneously a pressurized liquid is led into chamber 42R to vaporized and similarly drive the piston 45.

Piston 45 is formed with a pair of inlet bores 51L and 51R, with bore 51L extending from the left face 52L of piston 45 to a inlet recess 53L in the cylindrical wall 54 of piston 45 adjacent to right face 52R and bore 51R extending from piston face 52R to an inlet recess 53R adjacent to left face 52L. Inlet recesses 53R and 53L are bounded by sealant rings 59 and each is located to abut the mouth 55 of inlet port 29 in the mid position of cylinder wall 56 when the piston is at one position of maximum travel so as to valve the pressurized liquid from inlet port 29 into the chamber 42L or 42R which is at minimum volume. The inlet port 29 is sealed by piston wall 54 at all intermediate positions of the piston 45.

Each chamber 42L, 42R is fitted with an exhaust port 31 in the form of a cylindrical tube 61 that extends in an axial direction through the respective end wall 57 of the cylinder 40, with tube 61 joined to exhaust tube 32 leading to condensor 20. A hollow valve seat 62 is slidably mounted in tube 61 and biased by a compression spring 63 towards the cylinder 40 with a valve rod 64 slidably mounted in the axial direction, in piston 45, extending into tube 61. Each end 65 of the slide valve rod 64 is tapered to seat in valve seat 62 so as to close the axial valve seat port 67 when the rod end 65 abuts valve seat 62 under the bias of spring 63 and with valve seat 62 thus acting to seal exhaust port 31.

Since both exhaust ports 31 similarly interact with slide valve 64, the description will be given only in terms of exhaust port 31 communicating with cylinder chamber 42L.

Slide valve rod 64 is slidably mounted in threaded bearings 71L and 71R which enclose an pair of auxiliary cylinder chambers 72L and 72R in piston 45 bounded by the wall of the axial hole 70 in piston 45 through which rod 61 is freely mounted, with a piston 75 fitted with a sealing ring 76 partitioning chambers 72L and 72R. Left chamber 72L is joined by a bore 77 extending to the right piston face 52R and right chamber 72R is joined by a bore 78 extending to left piston face 52L. Thus, when piston 45 is moving rightwards, driven by the expansion of heated fluid in left chamber 22L; slide rod piston 75 and slide rod 64 is driven leftwards to seal exhaust port 31 of chamber 42L and open exhaust port 31 of chamber 42R. As piston 45 reaches the limit of travel, rod piston 75 hits the bearing 71L to lift slide rod 64 away from the valve seat 67 of chamber 42L and to open exhaust port 31 of chamber 32L while simultaneously the right end 65 of the slide rod abuts the valve seat 67 of the right end exhaust port 31 of chamber 42R to seal the right exhaust port 31 os that intake liquid through bore 51R will be sealed in chamber 42R and the consequent expansion as the liquid vaporizes, will drive piston 45 leftwards, exhausting chamber 42L.

Since obvious changes may be made in specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. An engine adaptable for powering the compressor of an air conditioner system, which engine is powered by the heat of an exhaust maniford of an internal combustion engine,
    said engine powered by the expansion of a fluid pressurized by a pump that is intermittently led into a cylinder chamber against a piston slidably mounted in said cylinder chamber, with the exhaust port of said chamber led through a condensor to the pump, said pump driven by said engine, with the walls of said cylinder enclosed by an exhaust manifold of said internal combustion engine, such that heat from said exhaust manifold causes the fluid in the cylinder chamber to vaporize and expand so as to drive the piston.

2. The combination as recited in claim 1 in which the piston is formed with a hollow bore leading from a face of the piston to a recess in a side wall of the piston and the cylinder wall is fitted about an inlet tube opening located so as to abut with the said piston recess when the piston is at a first position of extreme travel and the cylinder chamber is approaching a state of a minimum volume.

3. The combination as recited in claim 1 in which the exhaust port of the cylinder chamber is valved by slidable means mounted in the said piston, with pneumatic means to move said slidable means to a position to open the said exhaust port when the piston reaches a second position of extreme travel with the cylinder chamber approaching a state of maximum volume and to maintain the said exhaust port in the open condition during a period of travel of the piston from said second position to said first position, said pneumatic means serving to maintain said exhaust port in the closed position during a period of travel of the piston from the said first position to the said second position.

4. The combination as recited in claim 1 in which engine is formed of a cylinder divided into two chambers by the piston.

5. The combination as recited in claim 3 in which said pneumatic means are responsive to the differential of pressure between the pressure of the fluid in the said cylinder chamber and the pressure of fluid in another cylinder chamber.

* * * * *